US012688703B2

(12) United States Patent
Yen

(10) Patent No.: US 12,688,703 B2
(45) Date of Patent: Jul. 21, 2026

(54) SMART ROAD SURFACE DETECTION METHOD AND EDGE COLLECTION DEVICE, CLOUD-BASED ROAD SURFACE RECOGNITION MODULE AND SYSTEM THEREOF

(71) Applicant: HUNG MING INFORMATION CO., LTD., Taichung City (TW)

(72) Inventor: Chia Chun Yen, Taichung City (TW)

(73) Assignee: Hung Ming Information Co., Ltd., Taichung City (TW)

( * ) Notice: Subject to any disclaimer, the term of this patent is extended or adjusted under 35 U.S.C. 154(b) by 354 days.

(21) Appl. No.: 18/181,304

(22) Filed: Mar. 9, 2023

(65) Prior Publication Data

US 2024/0221393 A1 Jul. 4, 2024

(30) Foreign Application Priority Data

Dec. 28, 2022 (TW) .................................. 111150393
Dec. 28, 2022 (TW) .................................. 111150396

(51) Int. Cl.
*G06V 20/56* (2022.01)
*G01C 7/04* (2006.01)
*G06V 20/40* (2022.01)

(52) U.S. Cl.
CPC ............. *G06V 20/588* (2022.01); *G01C 7/04* (2013.01); *G06V 20/40* (2022.01)

(58) Field of Classification Search
CPC .... G06V 20/588; G06V 20/40; G06V 10/764; G06V 10/82; G06V 20/56; G01C 7/04
See application file for complete search history.

(56) References Cited

U.S. PATENT DOCUMENTS

2022/0126864 A1* 4/2022 Moustafa .......... B60W 60/0013

FOREIGN PATENT DOCUMENTS

CN 102663252 B * 12/2014

OTHER PUBLICATIONS

Redmon, You Only Look Once: Unified, Real-Time Object Detection, Proceedings of the IEEE Conference on Computer Vision and Pattern Recognition (CVPR), 2016, pp. 779-788 (Year: 2016).*
ASTM International, Standard Practice for Roads and Parking Lots Pavement Condition Index Surveys, 2018 (Year: 2018).*

* cited by examiner

*Primary Examiner* — Oneal R Mistry
*Assistant Examiner* — Justin Philip Cascais
(74) *Attorney, Agent, or Firm* — Rosenberg, Klein & Lee

(57) ABSTRACT

The present invention relates to a smart road surface detection method and edge collection devices, a cloud-based road surface recognition module and system thereof that mainly uses edge mobile devices to film and analyze the pavement condition indexes (PCI) characteristics of the MP4 in the bounding box of road surface, and corresponding F-IMU values, B-IMU values, and GPS data thereof in order to produce a plurality of metadata. The plurality of metadata are uploaded to a cloud server separately; then a road surface recognition module installed in the cloud server identifies and stores a PCI eigenvalue separately based on the individual metadata. Finally, the information of recognized results will be displayed in a geographic information system according to the GPS location thereof to facilitate inquiries by road administrative staff and road maintenance crews.

14 Claims, 11 Drawing Sheets

Data of front inertial
measurement unit

Data of rear inertial
measurement unit

SMART ROAD SURFACE DETECTION METHOD AND EDGE COLLECTION DEVICE, CLOUD-BASED ROAD SURFACE RECOGNITION MODULE AND SYSTEM THEREOF

BACKGROUND OF THE INVENTION

1. Fields of the Invention

The present invention relates to the domain of roadway management technology, and especially the technical scope of a smart road surface detection method and system thereof.

2. Descriptions of Related Art

"Smooth pavement, bright light, ditch clear" is always the goal of all local governments to accomplish, wherein "smooth pavement" is the highest demand and is viewed as an important achievement of local governors. Currently, typical pavement maintenance adopts two methods to detect road surface conditions: regular visual inspection by humans and public complaints. In contrast, currently available road surface detection devices are either relatively expensive or complicated, for example, the device described in Patent No. TWM386314U of Taiwan, ROC, "Pavement flatness measuring module of road inspection vehicle".

The pavement conditions are directly related to the safety of many people and vehicles on the roadways. When a roadway condition is reported or complained about by an individual, the condition is usually very serious or has caused a traffic accident already. Therefore, the author hopes to find a solution that helps the road administrative agencies precisely locate the section of a road that needs to be repaired so that the public is confident in the pavement maintenance operation.

SUMMARY OF THE INVENTION

In order to cope with the developments of smart living and smart cities, the author has conducted research and experiments intensively to develop a smart road surface detection method and edge collection devices, a cloud-based road surface recognition module, and a system thereof. A primary objective of the present invention is to create a smart road surface detection method and edge collection devices, a cloud-based road surface recognition module, and a system thereof, having a low construction cost; a secondary objective of the present invention is to create a smart road surface detection method and edge collection devices, a cloud-based road surface recognition module, and a system thereof that improve the accuracy of the pavement condition detection.

To achieve the aforementioned objectives, the present invention applies the following technical means: a cloud-based road surface recognition module, wherein the road surface recognition module is installed in the cloud server; the road surface recognition module identifies and stores the PCI eigenvalues of roads with poor pavement conditions based on data of PCI characteristics in the bounding box of road surface from video streaming and the corresponding inertial attitude thereof separately.

The cloud-based road surface recognition module is developed using Tensorflow development software and adapts scikit-learn as the machine learning library to perform data preprocessing and to create models. Furthermore, the road surface recognition module identifies and stores PCI eigenvalues of roads with poor pavement conditions from a plurality of streamed videos individually based on the metadata of roads with poor pavement conditions.

The cloud-based road surface recognition module adapts a supervised deep learning model framework and uses the YOLO computation method to identify data of the PCI eigenvalues of roads with poor pavement conditions from a plurality of streamed videos individually, and the corresponding front inertial attitude and rear inertial attitude thereof as tag files of a training sample for supervised learning; furthermore, corresponding associations are created among the PCI eigenvalues, front inertial attitude data, and rear inertial attitude data to enhance the recognition effect on poor pavement.

The cloud-based road surface recognition module is trained and tested by the method that conducts these steps in sequential order: a data preprocessing step, a machine learning model development and training step, a model evaluation step, and a prediction step, wherein the training sample set is split to two sets in the data preprocessing step, 75% for training data and 25% for testing set.

The cloud-based road surface recognition module generates tags files of training samples, wherein the tag file comprises GPS speed data.

A smart road surface detection method that uses the aforementioned cloud-based road surface recognition module comprises the following steps: an edge-based data collection step, which uses at least one edge mobile device to collect a plurality of streamed videos and corresponding data of a front inertial attitude, a rear inertial attitude, and GPS data thereof; an edge-based poor road surface detection and boxing step that conducts a preliminary recognition process on the plurality of streamed videos separately in order to select a PCI characteristic from the bounding boxes of road surface; a data information cloud uploads step that organizes the plurality of streamed videos and the corresponding front inertial attitude, rear inertial attitude, GPS information thereof into a plurality of metadata to be uploaded and stored in the cloud server; a cloud-based poor road surface recognition step, wherein the cloud server comprises a road surface recognition module and the road surface recognition module identifies and stores the PCI eigenvalues of the plurality of streamed videos based on a plurality of streamed videos of selected roads with poor pavements and the corresponding front inertial attitude, rear inertial attitude thereof separately; a road surface detection result output step, wherein the information of recognized results will be displayed in a geographic information system according to the GPS location thereof.

The smart road surface detection method has an edge-based poor road surface detection and boxing step using the object detector of the Tensorflow development software to recognize and create a bounding box for a PCI characteristic separately by processing a plurality of streamed videos of roadways, and at the same time to store data of the GPS, front inertial attitude, rear inertial attitude thereof in order to compile into a plurality of metadata.

The smart road surface detection method has an cloud-based poor road surface recognition step using PCI eigenvalues that have a total of 19 distress types based on the definitions of distress items specified in ASTM D6433-11, including alligator cracking, bleeding, block cracking, bumps and sags, corrugation, depressions, edge cracking, joint reflections cracking, lane/shoulder drop off, longitudinal and transversal cracking, patching and utility cut patching, polished aggregate, potholes, railroad crossing, rutting, shoving, slippage cracking, swell, weathering and raveling.

A smart road surface detection system constructed based on the aforementioned smart road surface detection method comprises: an edge mobile device, installed at the front end of a vehicle, wherein the edge mobile device comprises a lens unit, a display unit, a GPS positioning unit, a front inertial measurement unit, a memory unit, and a communication unit, which are electrically connected with a computation processor separately; an inertial measurement device, installed at the rear end of a vehicle, wherein the inertial measurement device comprises a rear inertial measurement unit and a transmission unit; an integrated application unit that is pre-stored in the memory unit of the edge mobile device and is called by the computation processor to execute operations of recording poor pavement and boxing the PCI characteristics in order to produce a series of streamed videos specifically, wherein the metadata of the streamed videos, front inertial attitude, rear inertial attitude, and GPS information are stored therein and uploaded to the cloud server through the edge mobile device; and a cloud server that receives data of the streamed videos, front inertial attitude, rear inertial attitude, and GPS information transmitted by the edge mobile device, wherein the cloud server comprises a road surface recognition module, wherein the road surface recognition module identifies and stores the PCI eigenvalues of roads with poor pavement conditions based on data of PCI characteristics in the bounding box of road surface from video streaming and the corresponding inertial attitude thereof separately, and finally the information of recognized results will be displayed in a geographic information system according to the GPS location thereof.

An edge collection device, used by the aforementioned smart road surface detection method, comprises: an edge mobile device, installed at the front end of a vehicle, wherein the edge mobile device comprises a lens unit, a display unit, a GPS positioning unit, a front inertial measurement unit, a memory unit, and a communication unit, which are electrically connected with a computation processor separately; an inertial measurement device, installed at the rear end of a vehicle, wherein the inertial measurement device comprises a rear inertial measurement unit and a transmission unit; an integrated application unit that is pre-stored in the memory unit of the edge mobile device and is called by the computation processor to execute operations of recording poor pavement and boxing the PCI characteristics in order to produce a series of streamed videos specifically, wherein the metadata of the streamed videos, front inertial attitude, rear inertial attitude, and GPS information are stored therein and uploaded to the cloud server through the edge mobile device;

Therefore, the present invention adopts the aforementioned technical means to achieve the following functions:

1. The complete system and equipment of the present invention simply comprises a vehicle, a cloud server, an edge mobile device, and an AI image recognition module for road surface which uses an edge computation architecture to share the computation workload of the cloud server. Therefore, the overall construction cost of the system is low. Furthermore, the present invention can provide assistance in acceptance checks on pavement and quickly determine the condition of a road surface.

2. The road surface recognition module of the present invention adapts a supervised deep learning model framework and uses data of the front inertial attitude, rear inertial attitude, and PCI eigenvalues as tag files of a training sample of poor pavement image recognition.

The trained road surface recognition module has a recognition effect with high accuracy.

DETAILED DESCRIPTION OF THE PREFERRED EMBODIMENT

Figure 1:
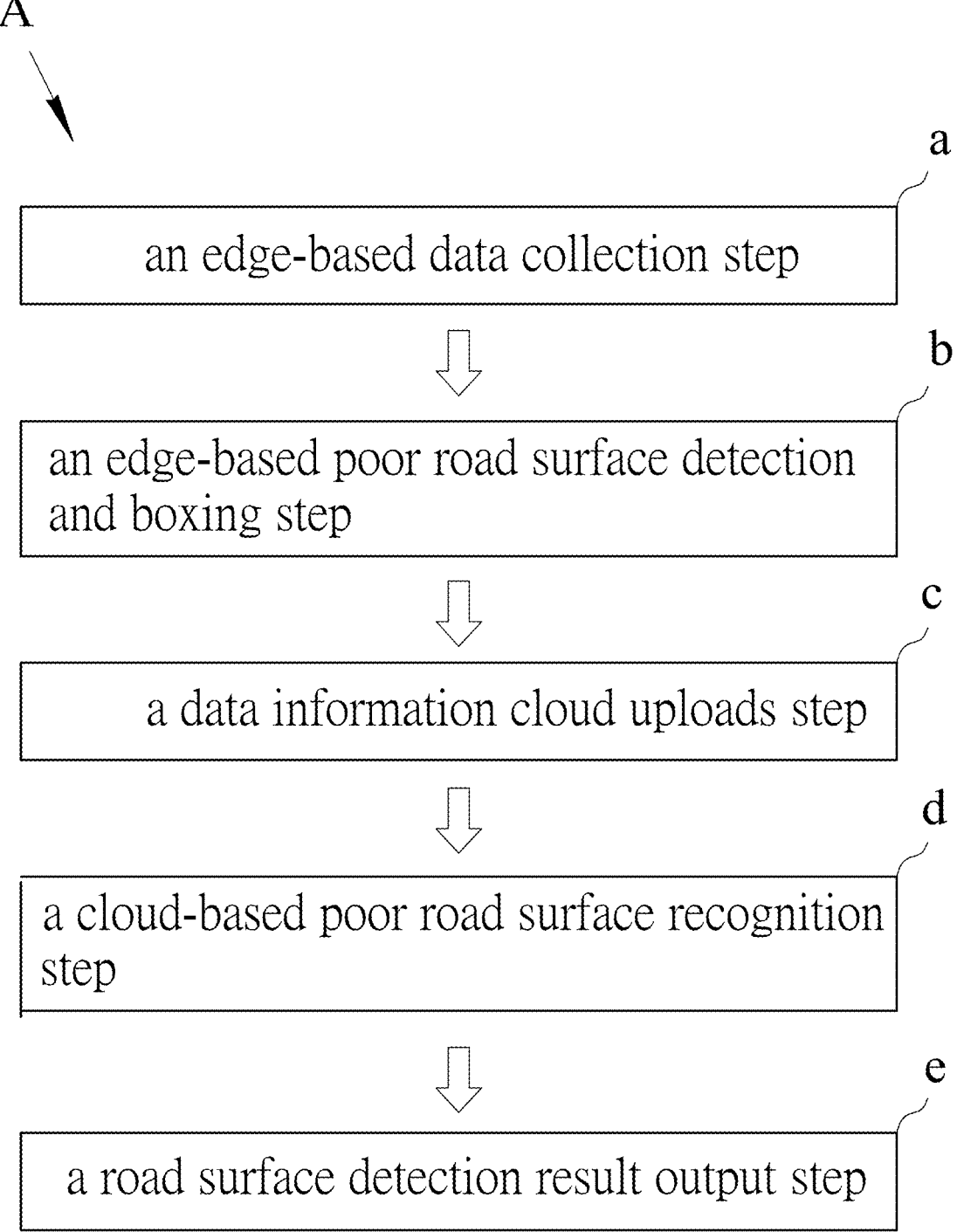
FIG. 1 illustrates a flow chart of steps of the smart road surface detection method of an example embodiment of the present invention.

The present invention relates to a smart road surface detection method and edge collection devices, a cloud-based road surface recognition module and system thereof that mainly provides a low-cost system to be constructed for detecting roadways with poor pavements and conditions in order to provide assistance in acceptance check on pavement and quickly determining the condition of a road surface for the ease of informing the maintenance department for road maintenance. The smart road surface detection method A, as shown in FIG. 1, comprises an edge-based data collection step a, an edge-based poor road surface detection and boxing step b, a data information cloud uploads step c, and a cloud-based poor road surface recognition step d. These steps are described, together with FIG. 1 and FIG. 2, as follows.

Figure 3:
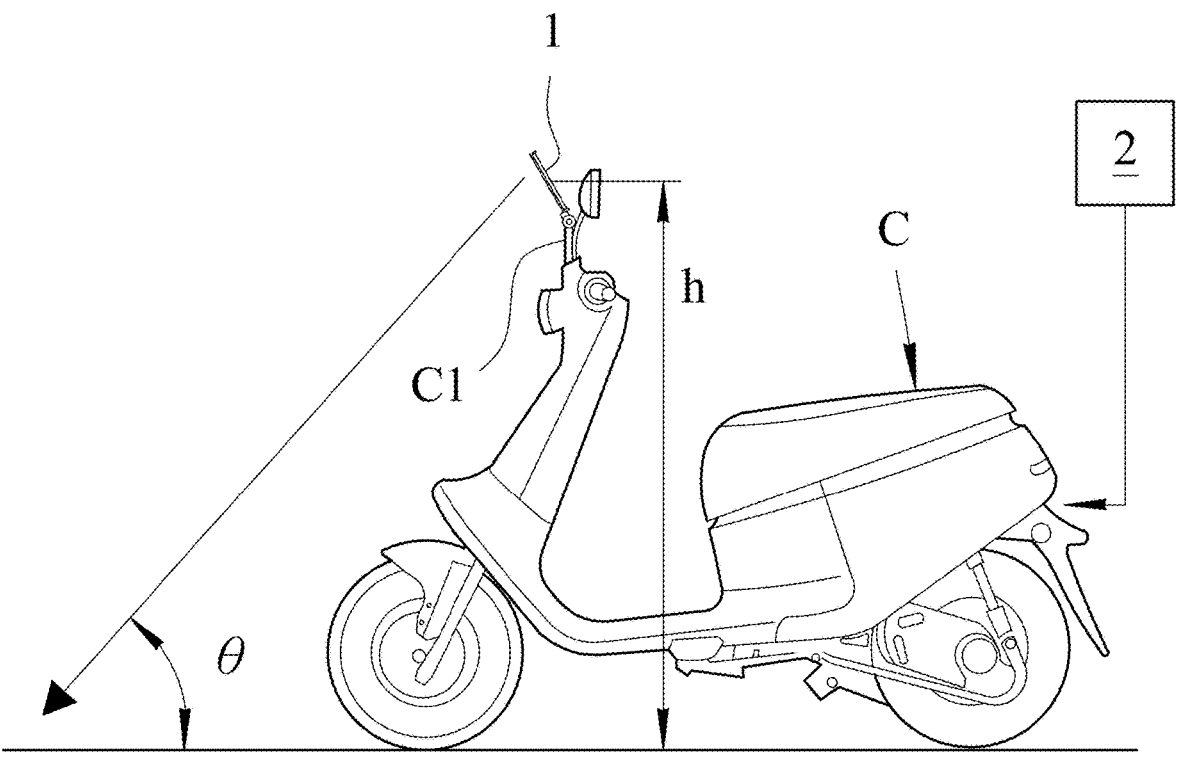
FIG. 3 illustrates a schematic diagram of the recording angle when a motorcycle, selected as the vehicle, travels out on the road.
Figure 4:
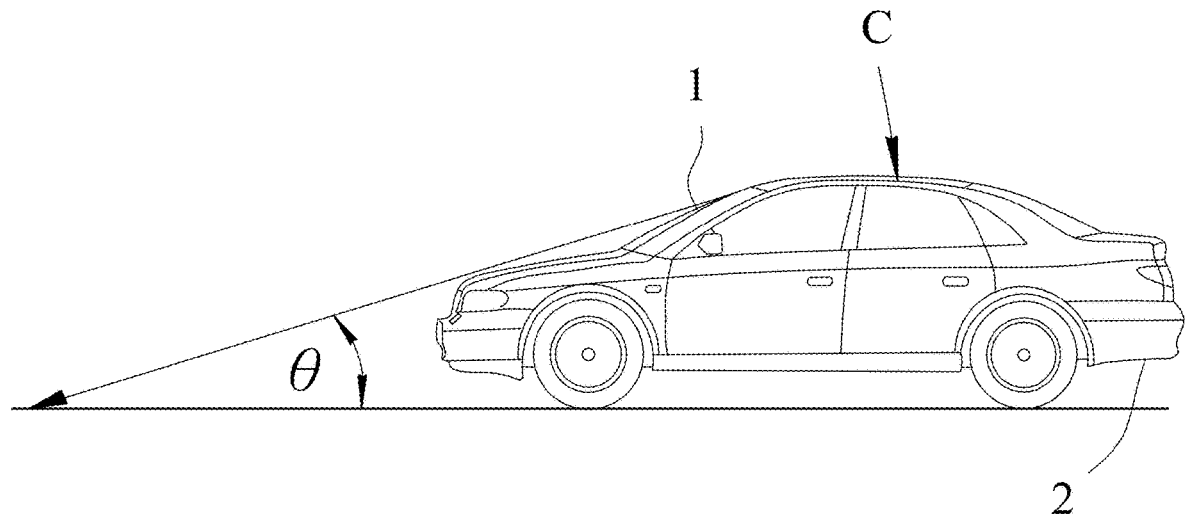
FIG. 4 illustrates a schematic diagram of the recording angle when a car, selected as the vehicle, travels out on the road.

The edge-based data collection step a, as shown in FIG. 3 and FIG. 4, uses at least one edge mobile device or a plurality of edge mobile devices to collect a plurality of streamed videos (available video formats include AVI, WMV, MOV, MP4, and RM; "MP4" format is assumed hereinafter for convenience and brevity) and corresponding data of a corresponding front inertial attitude, a rear inertial attitude, and GPS data thereof, wherein the optimal length of the road section with poor pavement recorded in the plurality of streamed videos is about 150 cm.

The edge-based data collection step a mainly uses an edge mobile device 1 and an inertial measurement device 2 at both the front end and rear end of the vehicle C separately, wherein the vehicle C is preferably a motorcycle, or a car as a preferable secondary option; the edge mobile device 1 is preferably a smart phone (but can also be a tablet computer and a separate device with a lens, for example, a laptop and a webcam). Data of the inertial attitude is determined from vector data measuring three-axis attitude angle, three-axis acceleration and/or three-axis Earth's magnetic field of an object detected by the inertial measurement unit (IMU). Thus, the front inertial attitude refers to the inertial attitude of the front end of the vehicle C, namely the F-IMU value eigenvalues of the plurality of streamed videos of selected roads with poor pavements. There is a total of 19 distress types in 4 major categories for the PCI eigenvalues according to the definitions of distress items specified in ASTM D6433-11, namely NO. 01 Alligator Cracking, NO. 02 Bleeding, NO. 03 Block Cracking, NO. 04 Bumps and Sags, NO. 05 Corrugation, NO. 06 Depression, NO. 07 Edge Cracking, NO. 08 Joint Reflection Cracking, NO. 09 Lane/Shoulder Drop Off, NO. 10 Longitudinal & Transversal Cracking, NO. 11 Patching & Utility Cut Patching, NO. 12 Polished Aggregate, NO. 13 Potholes, NO. 14 Railroad Crossing, NO. 15 Rutting, NO. 16 Shoving, NO. 17 Slippage Cracking, NO. 18 Swell, NO. 19 Weathering/Raveling, as listed in Table 1.

TABLE 1

| Category | No. | Distress Type | Category | No. | Distress Type |
|---|---|---|---|---|---|
| Crack | 01 | Alligator Cracking | Surface | 04 | Bumps and Sags |
| (Area) | 03 | Block Cracking | Deformation | 05 | Corrugation |
| | 17 | Slippage Cracking | | 06 | Depression |
| Crack | 07 | Edge Cracking | | 15 | Rutting |
| (Length) | 08 | Joint Reflection Cracking | | 16 | Shoving |
| | 10 | Longitudinal & Transversal Cracking | | 18 | Swell |
| Surface Deformation | 11 | Patching & Utility Cut Patching | Others | 02 | Bleeding |
| | 13 | Potholes | | 09 | Lane/Shoulder Drop Off |
| | 19 | Weathering/Raveling | | 12 | Polished Aggregate |
| | | | | 14 | Railroad crossing | in the present invention, whereas the rear inertial attitude refers to the inertial attitude of the rear end of the vehicle C, namely the B-IMU value in the present invention.

When the vehicle C travels out on the road with poor pavements to film and record the F-IMU value, B-IMU value, and GPS data, the F-IMU value and GPS data are detected and collected by the edge mobile device 1; the B-IMU value is detected and collected by the inertial measurement device 2, wherein the collected B-IMU values are transmitted to the edge mobile device 1 through wireless or wired communication.

Figure 5:
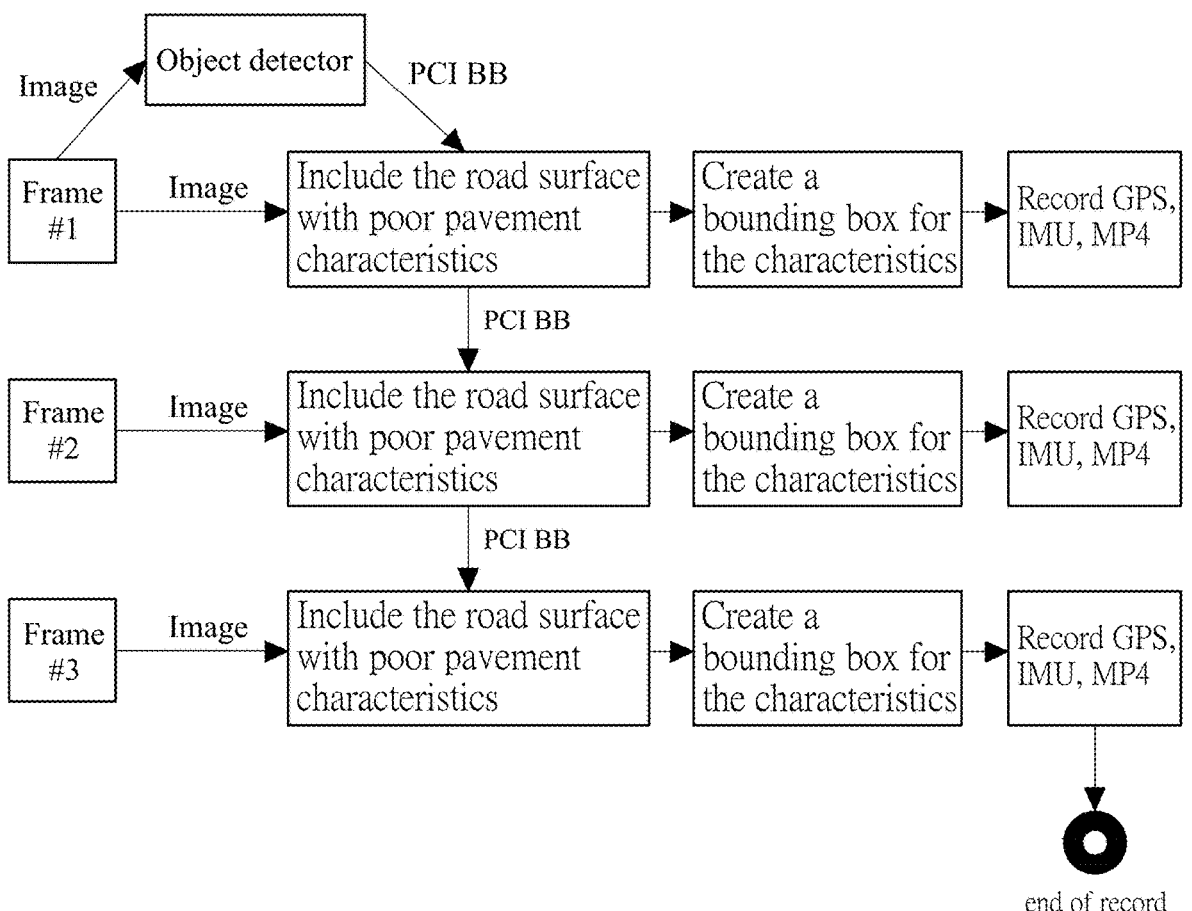
FIG. 5 illustrates an action schematic diagram of boxing PCI characteristics and recording the corresponding data of GPS, F-IMU value, B-IMU value, and MP4 by the edge mobile device of an example embodiment of the present invention.

The edge-based poor road surface detection and boxing step b, as shown in FIG. 5, uses the object detector of the Tensorflow development software to conduct a preliminary recognition of, and to create a bounding box for, a PCI characteristic separately by processing a plurality of MP4 of roadways, and at the same time to store corresponding data of the GPS, F-IMU values, B-IMU values thereof respectively in order to compile into a plurality of metadata. It is worth mentioning that the object detector is an object recognition function of the Tensorflow development software.

Figure 6:
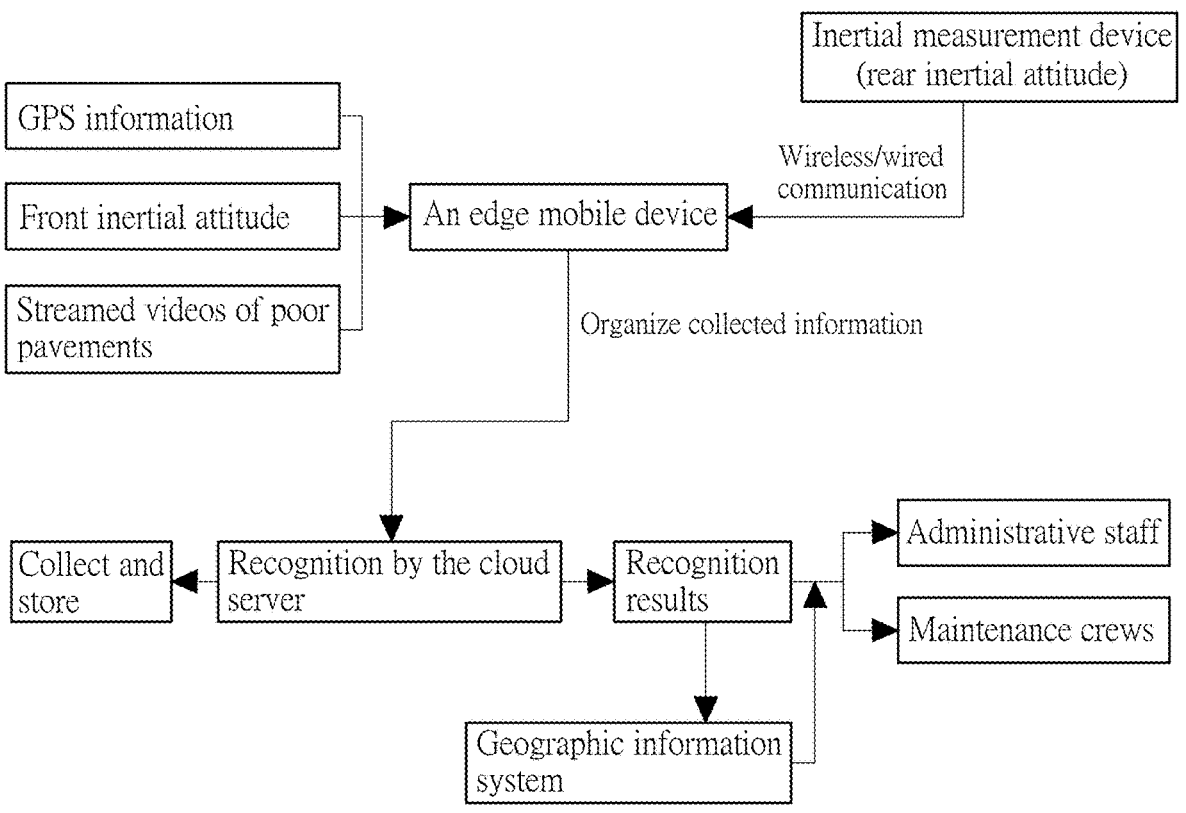
FIG. 6 illustrates an operation flow diagram of a smart road surface detection system of an example embodiment of the present invention.

The data information cloud uploads step c, as shown in FIG. 6, organizes the plurality of metadata collected from the aforementioned edge-based poor road surface detection and boxing step b to be uploaded and stored in the cloud server 4 separately for storage.

Figure 7:
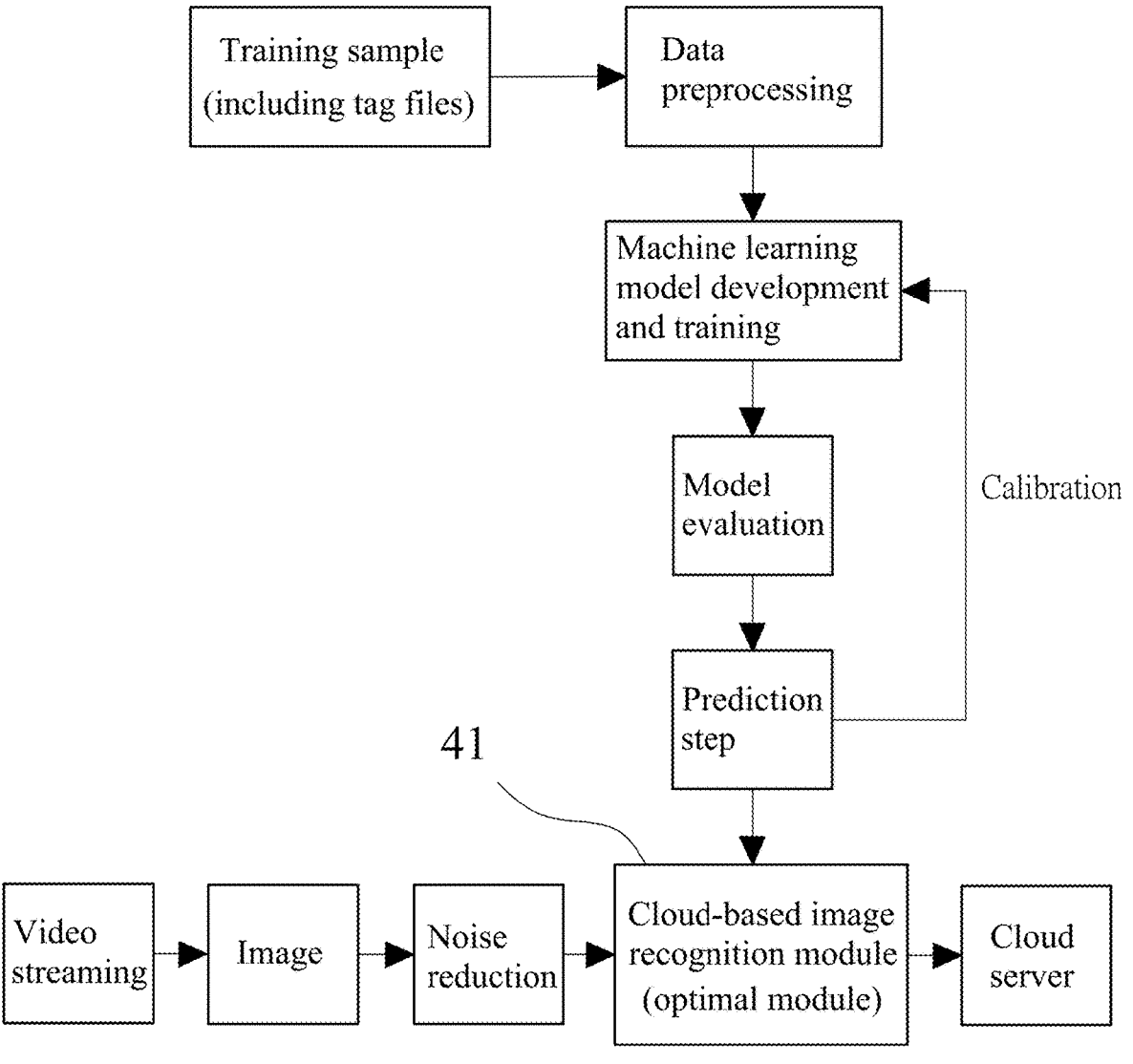
FIG. 7 illustrates a flow diagram of the computation and construction of the cloud-based image recognition module of an example embodiment of the present invention.

The cloud-based poor road surface recognition step d, as shown in FIG. 7, uses cloud server 4, which comprises a road surface recognition module 41, which is developed by Tensorflow development software and adapts scikit-learn as the machine learning library to perform data preprocessing and to create models. The road surface recognition module 41 identifies and stores the pavement condition index (PCI)

Further, in the cloud-based poor road surface recognition step d, the road surface recognition module 41 adapts a supervised deep learning model framework and uses a "You Only Look Once" (YOLO) computation method to identify data of the PCI eigenvalues of roads with poor pavement conditions from a plurality of streamed videos individually, so that the road surface recognition module 41 can identify the PCI eigenvalue, the F-IMU value, and the B-IMU value thereof to create the corresponding associations, in order to enhance the recognition effect on poor pavement. Furthermore, the training sample set is composed of a training data set and a testing data set, which account for 75% and 25% of the training sample set respectively. The tag files of the training sample can further include GPS speed data to enhance the accuracy of the pavement condition detection.

In particular, the road surface recognition model is refined and adjusted according to the training data. For supervised learning, the training data is a collection of example data used to refine the parameters (for example, weights on the connections between neurons in artificial neural networks). In these embodiments, the training data are usually data pairs composed of input vectors (scalar) and output vectors (scalar), wherein the output vector (scalar) is named as the target or label. During the training process, the aforementioned road surface recognition model performs prediction on every example of the training data and compares the prediction result with the target separately, whereas the learning computation method updates parameters of the road surface recognition model based on the comparison results. During the model refinement process, the operation can include selection of characteristics and parameter estimate.

The test set is used to provide an unbiased estimate to the final road surface recognition model.

In addition, the training steps of the road surface recognition module 41, as shown in FIG. 7, are as follows.

7

Step 1: A Data Preprocessing Step:

1. train_test_split( ) function of scikit-learn shuffles the sample data and splits it into two parts: 75% for training data and 25% for testing set. (The ratio of the two data sets can be defined by users. However, the aforementioned ratio is recommended.)

2. stratify=y: define the multi-layer based on the category ratio of the original target.

3. random state=0: use an integer to set the seed (other integers are acceptable) so that the data for each test remain the same.

4. train_test_split( ) function returns 4 sequences of NumPy arrays.

5. #X_train, X_test training and test data are all two-dimensional arrays with one sample data in each row.

6. #y_train, y_test training and test answers are all one-dimensional arrays with every element as one type of data.

Step 2: A Machine Learning Model Development and Training Step:

Construct a machine learning model to set the training data and answers, and use fit( ) a fitting method, to train the model.

Step 3: A Model Evaluation Step:

Use the score( ) method to calculate the training effect, set the test data and answers, and calculate the ratio of prediction accuracy.

Step 4: A Prediction Step:

When the training is completed and the training effect meets the standard, the model can perform prediction. Feed the new data; apply the predict( ) method for prediction.

Therefore, in the cloud-based poor road surface recognition step d, the road surface recognition module 41 is trained by the training samples and undergoes a series of training, testing, and refinement, to obtain an optimal recognition model. During the course of actual recognition process, the road surface recognition module 41 will pre-convert the MP4 files transmitted by the edge mobile device into a plurality of videos, and the road surface recognition module 41 then performs recognition after noise reduction is applied to every video separately.

The aforementioned road surface detection result output step e takes the information of recognized results from the previous step to be displayed in a geographic information system 5 according to the GPS location thereof.

Figure 2:
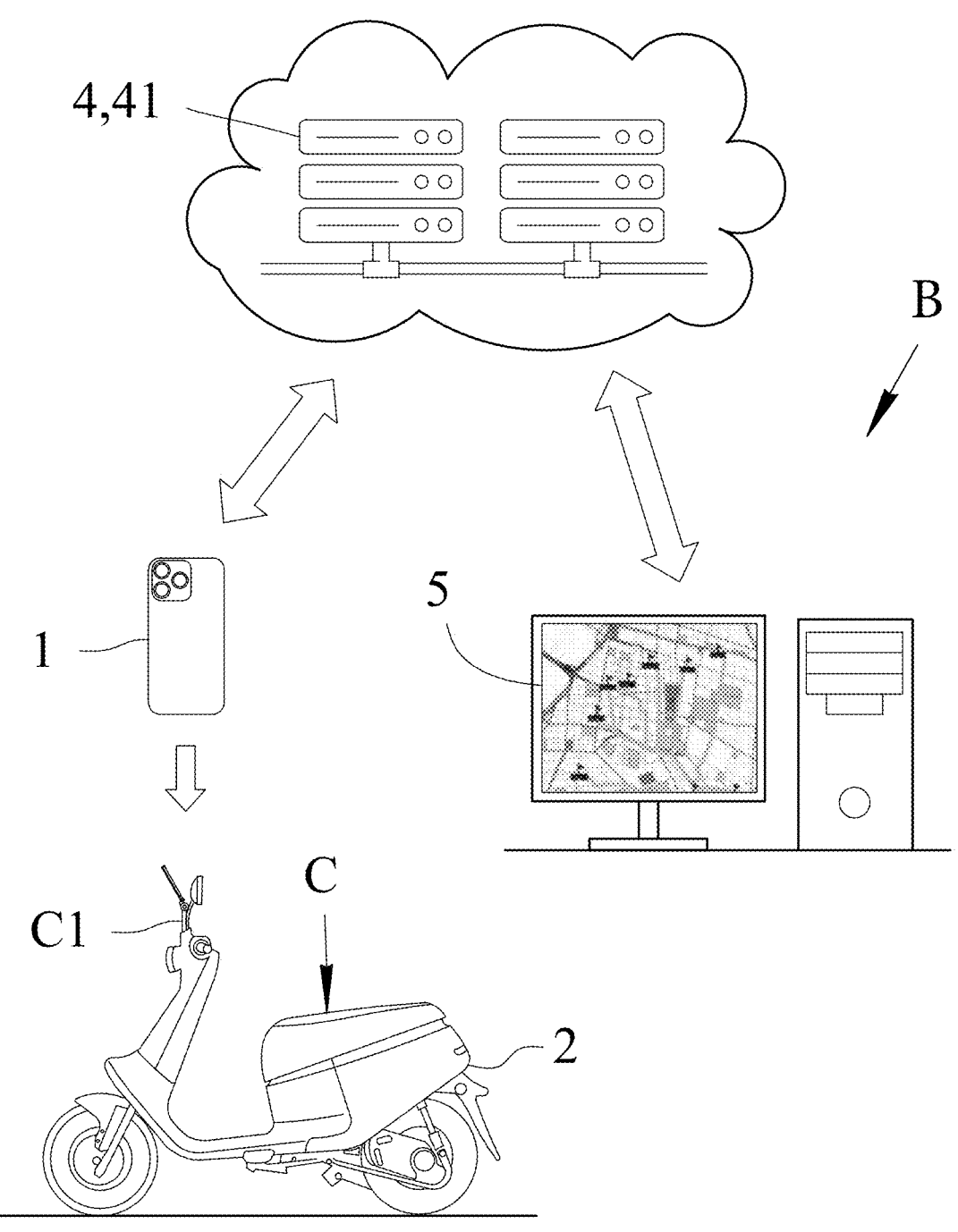
FIG. 2 illustrates a schematic diagram of the architecture of the smart road surface detection method of an example embodiment of the present invention.
Figure 8:
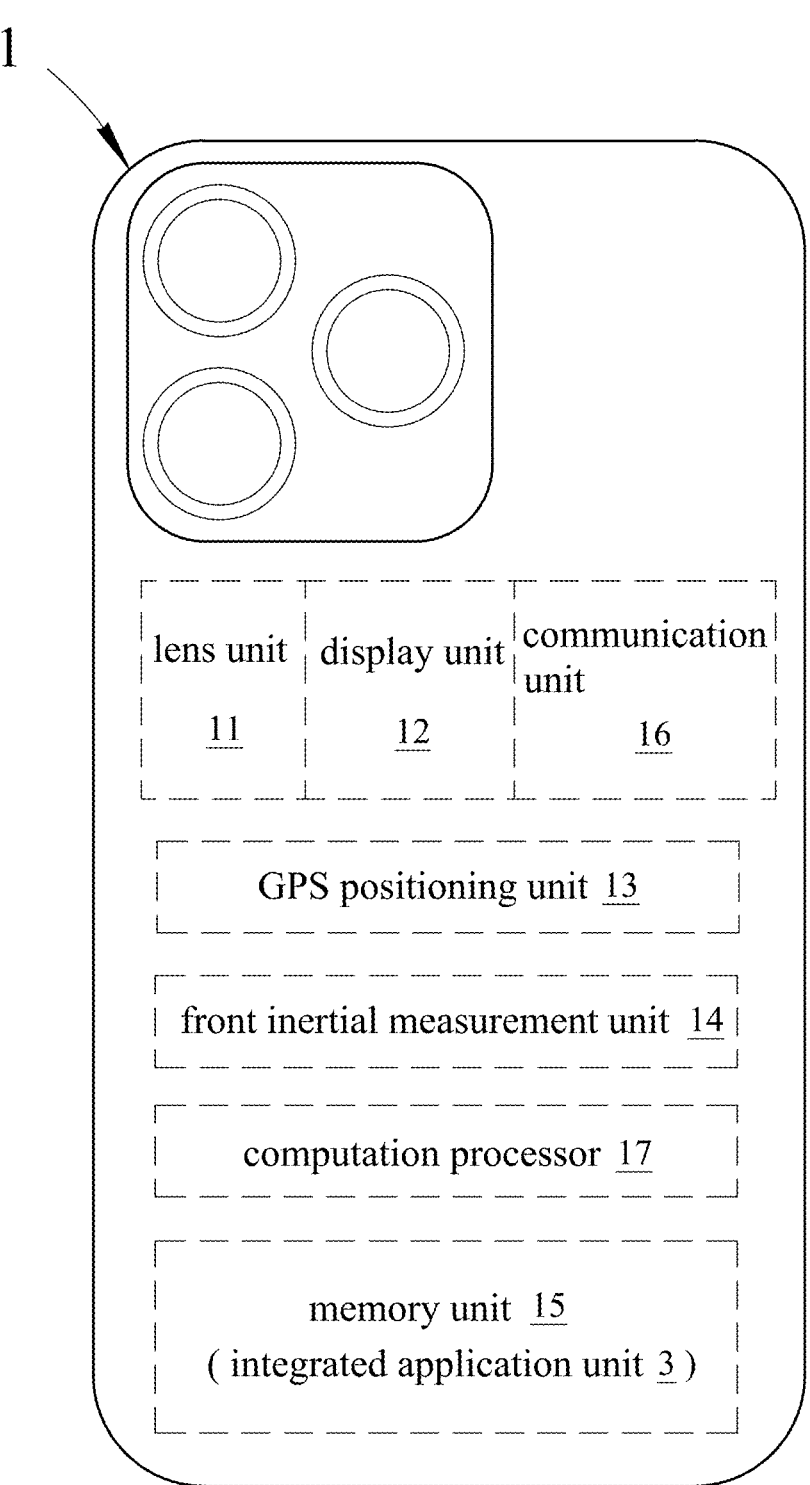
FIG. 8 illustrates a schematic diagram of the architecture of the edge mobile device of an example embodiment of the present invention.

Please refer to FIG. 2, FIG. 3, and FIG. 8. A smart road surface detection system B is constructed and implemented according to the aforementioned smart road surface detection method A in order to achieve the objectives of the present invention. The smart road surface detection system B comprises an edge mobile device 1, an inertial measurement device 2, an integrated application unit 3, and a cloud server 4. These devices are described, along with relevant figures, as follows.

The edge mobile device 1, as shown in FIG. 8, is a device that can provide edge computing and is installed at the front end of a vehicle C, for example, the handle of a motorcycle. The edge mobile device 1 comprises a lens unit 11, a display unit 12, a GPS positioning unit 13, a front inertial measurement unit 14, a memory unit 15, and a communication unit 16 therewithin, which are electrically connected with a computation processor 17 separately.

The lens unit 11 records the roadways with poor pavements; the GPS positioning unit 13 detects the GPS data of the vehicle C (also known as the GPS data of poor pavements); the front inertial measurement unit 14 installed at the front end of the vehicle C detects the F-IMU value; the memory unit 15 stores the integrated application unit 3 of the edge mobile device 1, and a plurality of metadata of MP4, GPS data, F-IMU values, B-IMU values; the communication unit 16 is coupled to the cloud server 4 through a mobile network and/or the internet to upload the plurality of metadata; and the computation processor 17 executes the integrated application unit 3 to provide MP4 of poor pavements, create bounding boxes, and, at the same time, obtain the detected GPS data, F-IMU values, B-IMU values corresponding to the MP4, in order to complete collecting the plurality of metadata.

Furthermore, vehicle C is preferably a motorcycle, as shown in FIG. 3, or a car, as a preferable secondary option shown in FIG. 4. A handlebar at the front part of the motorcycle is installed with a mobile phone holder C1 having an automatically or manually adjustable angle. The mobile phone holder C1 is in a location with a height above ground of 0.5~1.6 meters; the speed of the vehicle is set to below 120 km/hr in order to capture clear images. If a car is used as the vehicle, the smart phone is preferably installed on a bumper, a rear-view mirror, or a windscreen with a height above ground of 0.5~1.6 meters. The edge mobile device 1 is preferably a smart phone (or a tablet computer and a separate device with a lens, for example, a laptop and a webcam) to be held in the mobile phone holder C1 of a motorcycle wherein the camera angle θ of the lens unit 11 of the smart phone is set as 22~50 degrees. A motorcycle and a smart phone are very convenient for the purposes of the disclosed system; when an individual visually recognizes a poor pavement, the person can drive up to the area of poor pavement and film the road section to obtain a plurality of metadata while travelling out on the road.

Figure 9:
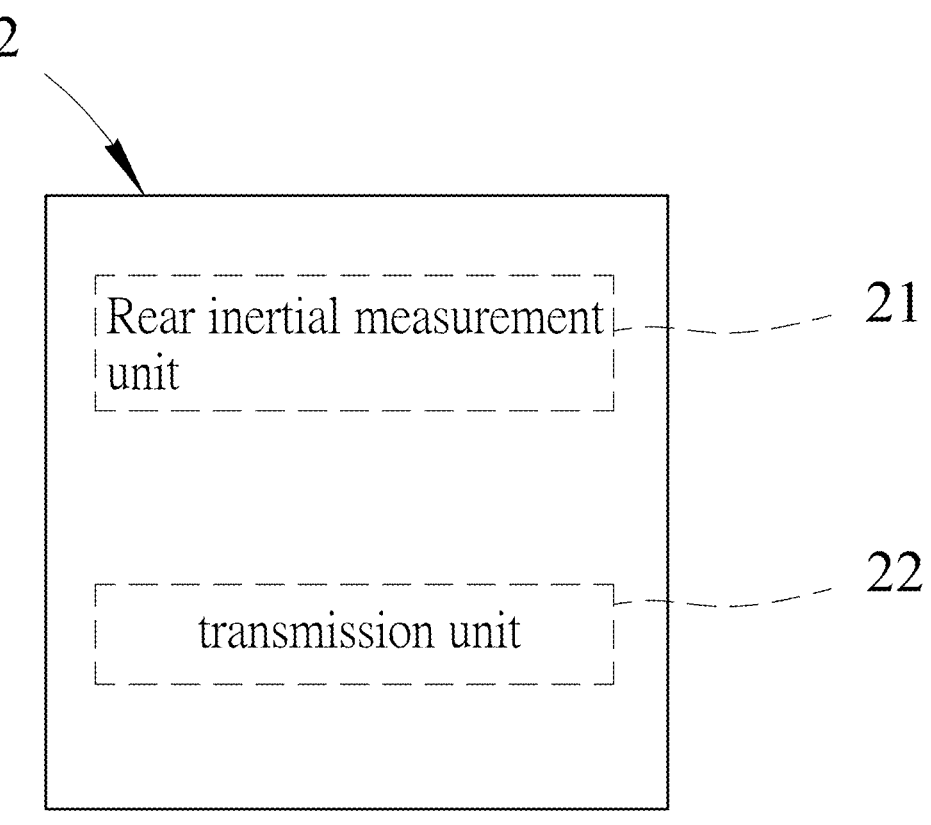
FIG. 9 illustrates a schematic diagram of the architecture of the inertial measurement device of an example embodiment of the present invention.
Figure 10:
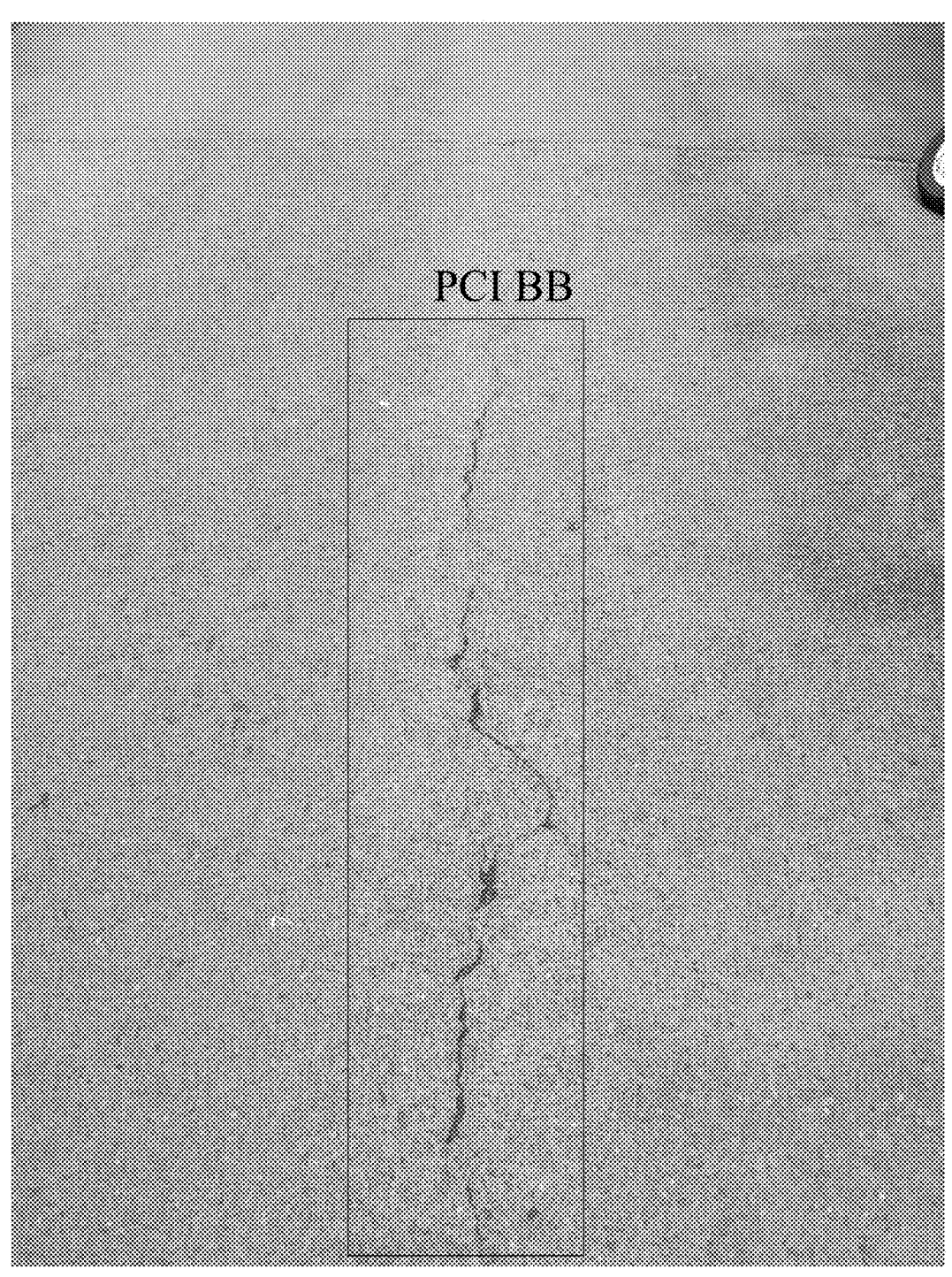
FIG. 10 illustrates an image of the pavement of a poor road surface of an example embodiment of the present invention.

The inertial measurement device 2, as shown in FIG. 3 and FIG. 9, installed at the rear end of the vehicle C, comprises a rear inertial measurement unit 21 and a transmission unit 22. The rear inertial measurement unit 21 detects the B-IMU value at the rear end of the vehicle C; the transmission unit 22 pre-transmits data of the rear inertial attitude to the edge mobile device 1 through wireless or wired communication for integration in order to obtain metadata. Table 2 and Table 3 provide an example set of metadata for the damaged road depicted in FIG. 10.

TABLE 2

| N<sup>th</sup> | Front inertial measurement unit (F-IMU) | | | | | | | | | | speed |
|---|---|---|---|---|---|---|---|---|---|---|---|
| second | Accelerometer | | | Gyroscope | | | Earth's magnetic field | | | | |
| of video | X-axis | Y-axis | Z-axis | X-axis | Y-axis | Z-axis | X-axis | Y-axis | Z-axis | GPS position | per hour |
| 1<sup>st</sup> second | 4.753 | 8.481 | −1.621 | 0.009 | −0.025 | 0.015 | −4.950 | −43.481 | 6.256 | Latitude: 120° 48' | 90 km/hr |

TABLE 2-continued

| $N^{th}$ second of video | Front inertial measurement unit (F-IMU) | | | | | | | | | | |
|---|---|---|---|---|---|---|---|---|---|---|---|
| | Accelerometer | | | Gyroscope | | | Earth's magnetic field | | | | speed |
| | X-axis | Y-axis | Z-axis | X-axis | Y-axis | Z-axis | X-axis | Y-axis | Z-axis | GPS position | per hour |
| $2^{nd}$ second | 4.742 | 8.486 | −1.460 | −0.038 | −0.028 | 0.007 | −4.969 | −43.669 | 6.406 | 13.32" North | |
| $3^{rd}$ second | 4.738 | 8.492 | −1.535 | −0.003 | −0.025 | 0.007 | −4.931 | 43.688 | 6.481 | Longitude: 120° 59' | |
| $4^{th}$ second | 4.773 | 8.469 | −1.511 | −0.003 | −0.004 | 0.009 | −4.800 | −43.819 | 6.500 | 30.468" East | |

TABLE 3

| $N^{th}$ second of video | Rear inertial measurement unit (B-IMU) | | | | | | | | | | |
|---|---|---|---|---|---|---|---|---|---|---|---|
| | Accelerometer | | | Gyroscope | | | Earth's magnetic field | | | | speed |
| | X-axis | Y-axis | Z-axis | X-axis | Y-axis | Z-axis | X-axis | Y-axis | Z-axis | GPS position | per hour |
| $1^{st}$ second | 4.745 | 8.483 | −1.521 | 0.000 | 0.001 | 0.003 | −4.706 | −43.875 | 6.538 | Latitude: 120° 48' | 90 km/hr |
| $2^{nd}$ second | 4.807 | 8.442 | −1.518 | −0.002 | −0.003 | 0.013 | −4.650 | −43.950 | 6.594 | 13.32" North | |
| $3^{rd}$ second | 4.761 | 8.473 | −1.547 | 0.002 | 0.000 | −0.003 | −4.631 | 43.969 | 6.688 | Longitude: 120° 59' | |
| $4^{th}$ second | 4.791 | 8.446 | −1.525 | −0.003 | 0.001 | 0.006 | −4.575 | 43.950 | 6.688 | 30.468" East | |

The transmission unit 22 preferably transmits using the Bluetooth™ standard.

The integrated application unit, as shown in FIG. 8, is software code pre-stored and installed in the memory unit 15 of the edge mobile device 1, and is called by the computation processor 17 to execute operations of recording poor pavements and collecting a plurality of metadata for storage, and at the same time enables the communication unit 16 to upload data to the cloud server 4.

The cloud server 4 receives a plurality of metadata containing MP4, GPS data, F-IMU values, and B-IMU values, transmitted by the edge mobile device 1. The cloud server 4 comprises a road surface recognition module 41, wherein the road surface recognition module 41 recognizes and stores the PCI eigenvalues of roads with poor pavement conditions separately based on the plurality of metadata. The final information of recognized results will be displayed in a geographic information system 5 according to the GPS location thereof.

Therefore, the present invention provides a smart road surface detection method and edge collection devices, a cloud-based road surface recognition module, and a system thereof as an optimal solution. After the edge mobile device 1 is installed on the vehicle C and activated, the integrated application unit 3 will enable the recognition function of the edge mobile device 1 and calibrate the camera angle θ of the lens unit 11, and initiate the data transmission of GPS and F-IMU of the edge mobile device 1, the lens unit, and B-IMU of the inertial measurement device 2.

Figure 11:
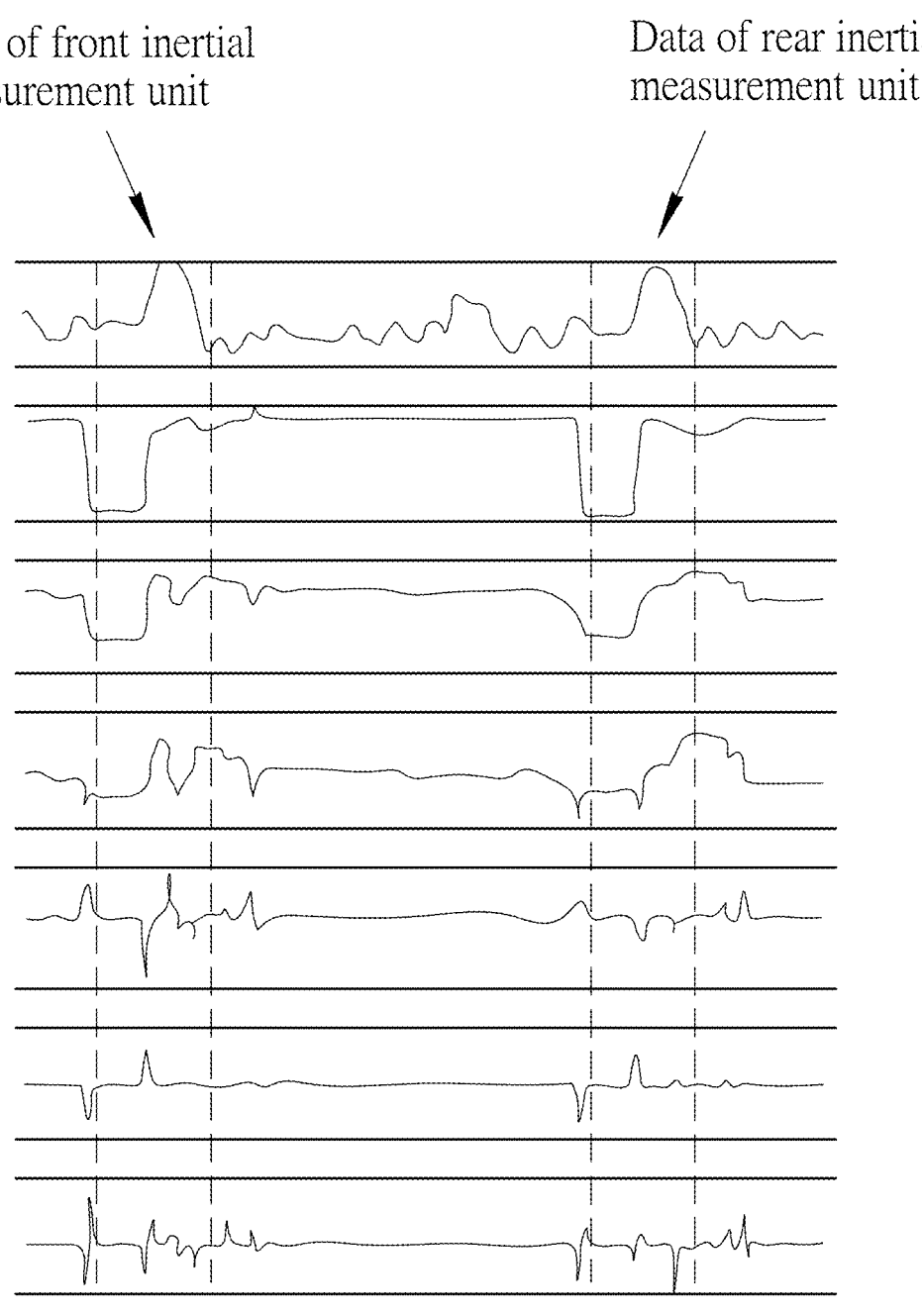
FIG. 11 illustrates a schematic diagram of the measured front inertia data and the measured rear inertia data of an example embodiment of the present invention.

Next, after the Tensorflow library is loaded and invokes road surface tag files from the cloud server 4, the Tensorflow software begins to recognize PCI characteristics. When cracks and potholes are recognized, the metadata of GPS, F-IMU, B-IMU, and MP4 are recorded. Last, background transmission is initiated; if network communication is available, the recorded metadata are transmitted to the cloud server 4 for further recognition of the PCI characteristics. The road surface recognition module 41 will identify the characteristic waveform and nine axis parameters based on F-IMU and B-IMU data, as shown in FIG. 11. Since different PCI characteristics are produced, the road surface recognition module 41 can further recognize every PCI characteristics based on different nine axis parameters. If network communication is not available, the recorded metadata are stored in advance and are uploaded to the cloud server 4 later when the network communication becomes available.

An edge collection device, used by the aforementioned smart road surface detection method, comprises: the aforementioned edge mobile device 1, the aforementioned inertial measurement device 2, and the aforementioned integrated application unit 3. The edge collection device specifically collects a plurality of metadata of MP4, GPS, F-IMU values, and B-IMU values of poor pavements and uploads the data to the cloud server 4 for further subsequent processing.

As shown in FIG. 11, when an embodiment of the present invention performs data collection, relevant data of GPS and F-IMU values of a smart phone, B-IMU, and videos can be input to the system at any time. Since the data source has large amounts of data, the present invention can apply big data processing techniques. In other words, when a road condition (problem characteristics) is detected by a device (data source), it is defined as an accidental event. The system will inform relevant personnel to handle the accidental event, thus improving the problem-solving efficiency.

What is claimed is:

1. A non-transitory computer-readable recording medium having recorded thereon a cloud-based road surface recognition module for installation within a cloud server, the road surface recognition module comprising software code executable by at least one processor to identify and store pavement condition index (PCI) eigenvalues of roads with poor pavement conditions separately based on data of PCI characteristics in a bounding box of a road surface captured from video streaming and a corresponding inertial attitude thereof measured by a front inertial sensor installed at a front of a vehicle and a rear inertial sensor installed at a rear of the vehicle, wherein associations are created between the PCI eigenvalues, front inertial attitude data, and rear inertial attitude data, each front inertial attitude value in the data having a corresponding rear inertial attitude value measured concurrently therewith.

2. The recording medium as claimed in claim 1, wherein the road surface recognition module identifies and stores the PCI eigenvalues of roads with poor pavement conditions from a plurality of streamed videos individually based on metadata of roads with poor pavement conditions.

3. The recording medium as claimed in claim 2, wherein the road surface recognition module adapts a supervised deep learning model framework and uses a "You Only Look Once" (YOLO) computation method to identify data of the PCI eigenvalues of roads with poor pavement conditions from a plurality of training streamed videos individually, and assigns the corresponding front inertial attitude and rear inertial attitude thereof as tag files of a training sample for supervised learning.

4. The recording medium as claimed in claim 3, wherein the road surface recognition module is trained and tested by performing, in sequential order: a data preprocessing step, a machine learning model development and training step, a model evaluation step, and a prediction step, and wherein a sample set is split in the data preprocessing step, placing 75% of training samples within a training data set and 25% of training samples within a testing data set.

5. The recording medium as claimed in claim 4, wherein the tag files of the training samples further comprise GPS speed data.

6. The recording medium as claimed in claim 1, wherein the PCI eigenvalues comprise 19 distress types based on the definitions of distress items specified in ASTM D6433-11, including alligator cracking, bleeding, block cracking, bumps and sags, corrugation, depressions, edge cracking, joint reflections cracking, lane/shoulder drop off, longitudinal and transversal cracking, patching and utility cut patching, polished aggregate, potholes, railroad crossing, rutting, shoving, slippage cracking, swell, and weathering and raveling.

7. The recording medium as claimed in claim 1, wherein the PCI eigenvalues are identified based at least in part on at least one characteristic waveform storing a front inertial attitude value together with the corresponding rear inertial attitude value.

8. A smart road surface detection method comprising:
using at least one edge mobile device to collect a plurality of streamed videos of roadways with poor pavements and corresponding data of a front inertial attitude, a rear inertial attitude, and GPS data thereof, the front inertial attitude measured by a front inertial sensor installed at a front of a vehicle, the rear inertial attitude measured by a rear inertial sensor installed at a rear of the vehicle;
conducting a preliminary recognition process on the plurality of collected streamed videos separately in order to select a pavement condition index (PCI) characteristic from bounding boxes of a road surface;

organizing the plurality of collected streamed videos and the corresponding inertial attitude, rear inertial attitude, and GPS data thereof into a plurality of metadata to be uploaded and stored in a cloud server, wherein each front inertial attitude value in the metadata has a corresponding rear inertial attitude value measured concurrently therewith;

by a road surface recognition module executing on the cloud server:
identifying and storing PCI eigenvalues of at least one of the plurality of collected streamed videos based on a plurality of testing streamed videos of selected roads with poor pavements and the corresponding front inertial attitude and rear inertial attitude thereof separately, and
deriving surface recognition results for the at least one of the plurality of collected streamed videos from the PCI eigenvalues, front inertial attitude, and rear inertial attitude thereof; and
displaying the derived surface recognition results for the at least one of the plurality of streamed videos in a geographic information system according to the GPS data thereof.

9. The smart road surface detection method as claimed in claim 8, wherein the bounding boxes for the PCI characteristics are recognized and created separately by processing, by an object detector, a plurality of streamed videos of roadways, while storing the GPS data, front inertial attitude, and rear inertial attitude thereof in order to compile into a plurality of metadata.

10. The smart road surface detection method as claimed in claim 8, wherein the PCI eigenvalues comprise 19 distress types based on the definitions of distress items specified in ASTM D6433-11, including alligator cracking, bleeding, block cracking, bumps and sags, corrugation, depressions, edge cracking, joint reflections cracking, lane/shoulder drop off, longitudinal and transversal cracking, patching and utility cut patching, polished aggregate, potholes, railroad crossing, rutting, shoving, slippage cracking, swell, and weathering and raveling.

11. A smart road surface detection system configured to perform the smart road surface detection method as claimed in claim 8, comprising:
an edge mobile device, installed at a front end of a vehicle, wherein the edge mobile device comprises a lens unit, a display unit, a GPS positioning unit, a front inertial measurement unit, a memory unit, and a communication unit, which are electrically connected with a computation processor separately;
an inertial measurement device, installed at a rear end of the vehicle, wherein the inertial measurement device comprises a rear inertial measurement unit and a transmission unit;
an integrated application unit that is pre-stored in the memory unit of the edge mobile device and is called by the computation processor to execute operations of recording poor pavement and boxing the pavement condition index (PCI) characteristics in order to produce a series of streamed videos, wherein the metadata of the streamed videos, including front inertial attitude, rear inertial attitude, and GPS data, are stored therein and transmitted through the edge mobile device, each front inertial attitude value in the metadata having a corresponding rear inertial attitude value measured concurrently therewith; and
a cloud server that receives the streamed videos, front inertial attitude, rear inertial attitude, and GPS data transmitted by the edge mobile device, the cloud server comprising a road surface recognition module executing thereon, wherein the road surface recognition module identifies and stores the PCI eigenvalues of roads with poor pavement conditions based on data of PCI characteristics in a bounding box of a road surface from video streaming and the corresponding inertial attitude thereof separately, information of recognized results being displayed in a geographic information system according to the GPS location thereof.

12. The smart road surface detection system as claimed in claim 11, wherein the PCI eigenvalues comprise 19 distress types based on the definitions of distress items specified in ASTM D6433-11, including alligator cracking, bleeding, block cracking, bumps and sags, corrugation, depressions, edge cracking, joint reflections cracking, lane/shoulder drop off, longitudinal and transversal cracking, patching and utility cut patching, polished aggregate, potholes, railroad crossing, rutting, shoving, slippage cracking, swell, and weathering and raveling.

13. An edge collection device configured to perform the smart road surface detection method as claimed in claim 8, comprising:

an edge mobile device, installed at a front end of a vehicle, wherein the edge mobile device comprises a lens unit, a display unit, a GPS positioning unit, a front inertial measurement unit, a memory unit, and a communication unit, which are electrically connected with a computation processor separately;

an inertial measurement device, installed at a rear end of the vehicle, wherein the inertial measurement device comprises a rear inertial measurement unit and a transmission unit; and an integrated application unit that is pre-stored in the memory unit of the edge mobile device and is called by the computation processor to execute operations of recording poor pavement and boxing the PCI characteristics in order to produce a series of streamed videos, wherein the metadata of the streamed videos, including front inertial attitude, rear inertial attitude, and GPS data, are stored therein and uploaded to a cloud server through the edge mobile device, each front inertial attitude value in the metadata having a corresponding rear inertial attitude value measured concurrently therewith.

14. The edge collection device as claimed in claim 13, wherein the PCI eigenvalues comprise 19 distress types based on the definitions of distress items specified in ASTM D6433-11, including alligator cracking, bleeding, block cracking, bumps and sags, corrugation, depressions, edge cracking, joint reflections cracking, lane/shoulder drop off, longitudinal and transversal cracking, patching and utility cut patching, polished aggregate, potholes, railroad crossing, rutting, shoving, slippage cracking, swell, and weathering and raveling.

* * * * *